May 14, 1963    M. M. KOLLANDER    3,089,307
ROTARY JET ENGINE
Filed June 17, 1960    4 Sheets-Sheet 1
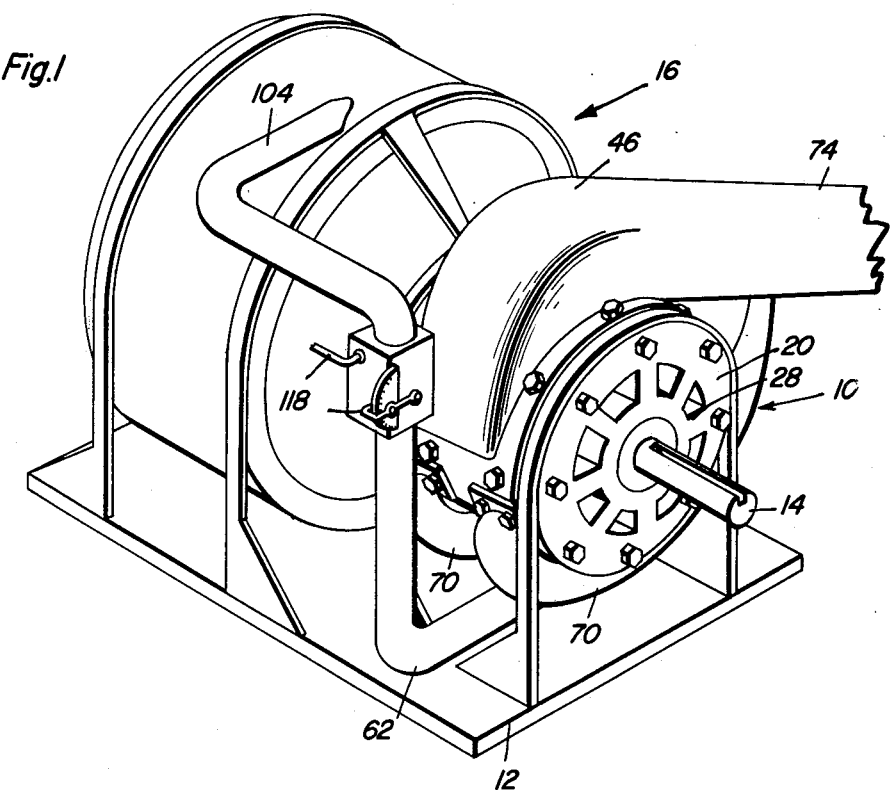
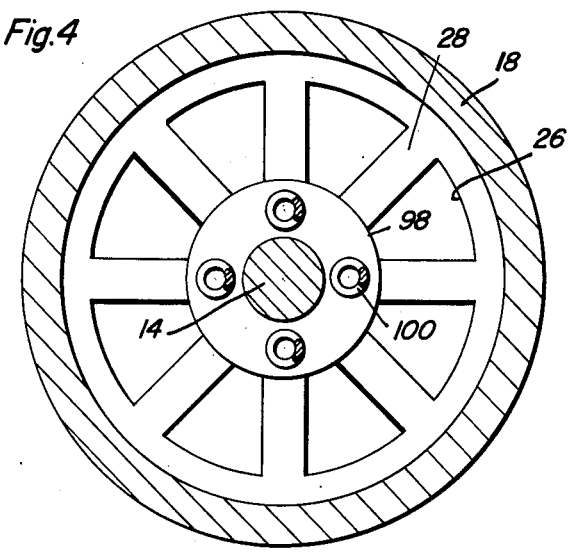
Melvin M. Kollander
INVENTOR.

May 14, 1963 M. M. KOLLANDER 3,089,307
ROTARY JET ENGINE
Filed June 17, 1960 4 Sheets-Sheet 2

Melvin M. Kollander
INVENTOR.

May 14, 1963  M. M. KOLLANDER  3,089,307
ROTARY JET ENGINE
Filed June 17, 1960  4 Sheets-Sheet 3

Melvin M. Kollander
INVENTOR.

BY *Clarence A. O'Brien*
*and Harvey B. Jacobson*
Attorneys

May 14, 1963
M. M. KOLLANDER
3,089,307
ROTARY JET ENGINE
Filed June 17, 1960
4 Sheets-Sheet 4
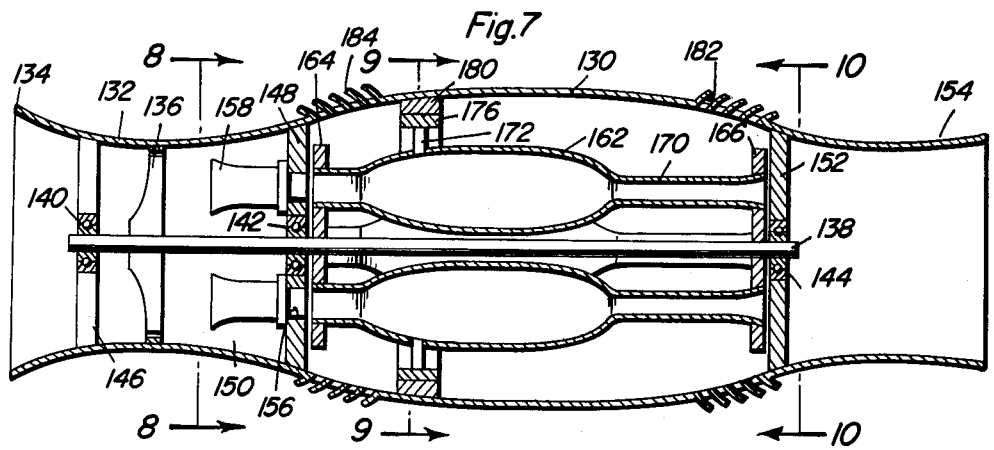
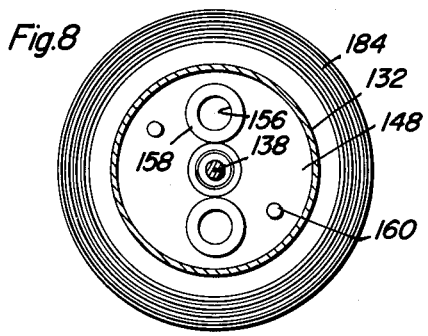
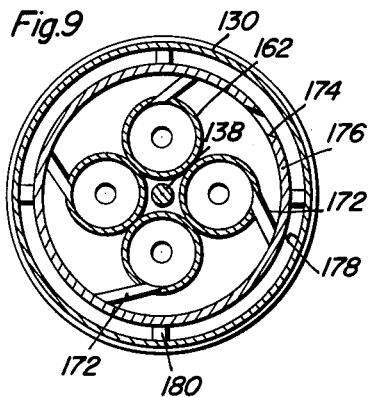
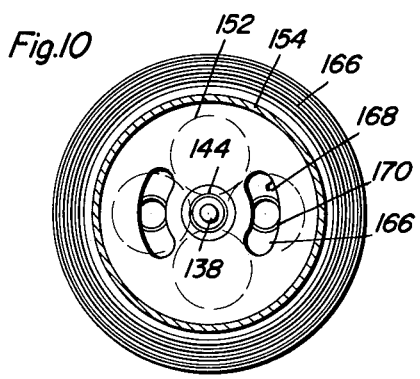
Melvin M. Kollander
INVENTOR.
BY *Clarence A. O'Brien*
*and Harvey B. Jacobson*
Attorneys 3,089,307
ROTARY JET ENGINE
Melvin M. Kollander, Sandia Park, N. Mex.
(P.O. Box 220, Cedar Crest, N. Mex.)
Filed June 17, 1960, Ser. No. 36,956
4 Claims. (Cl. 60—39.34)

The present invention generally relates to novel and improved structural arrangements in internal combustion engines of the rotary type, and more particularly to such improvements in a rotary jet engine.

The primary object of the present invention is to provide a rotary jet engine producing shaft torque by a reaction force created by expansion of combustion products on the perimeter of the rotor.

Another object of the present invention is to provide a rotary jet engine in the form of a constant volume reaction engine of either a single cycle or double cycle for materially increasing the effectiveness of the rotary jet engine.

Still another object of the present invention is to provide a rotary jet engine having a novel rotor with a plurality of circumferentially spaced combustion chambers therein together with a passageway extending to the periphery of the rotor disposed generally in tangential relation to the outer edge portion of the combustion chamber for expansion into an enlarged expansion area in the surrounding casing of the motor.

A very important object of the present invention is to provide a rotor construction which is tapered longitudinally for movement in relation to the casing for purposes of controlling the clearance between the rotor and the casing, thus enabling the rotor to move longitudinally in relation to the casing as the rotor expands in relation to the casing or stator.

Still another important object of the present invention is to provide a rotary jet engine in which the expanding exhaust products are exhausted both radially and longitudinally, together with a rotor valving assembly for providing a pulse jet engine adaptable for use with light aircraft.

Still another object of the present invention is to provide a rotary jet engine which is relatively simple in construction, efficient in operation, foolproof, novel in many structural details and generally inexpensive to manufacture.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the rotary jet engine of the present invention;

FIGURE 4 is a transverse sectional view taken substantially upon a plane passing along section line 4—4 of FIGURE 2, illustrating the structural details of the thrust springs and also the porting arrangement in the end of the stator;

FIGURE 7 is a longitudinal sectional view similar to FIGURE 2 but illustrating a pulse jet engine;

FIGURE 8 is a transverse sectional view taken substantially upon a plane passing along section line 8—8 of FIGURE 7 illustrating the intake of the pulse jet engine;

Figure 2:
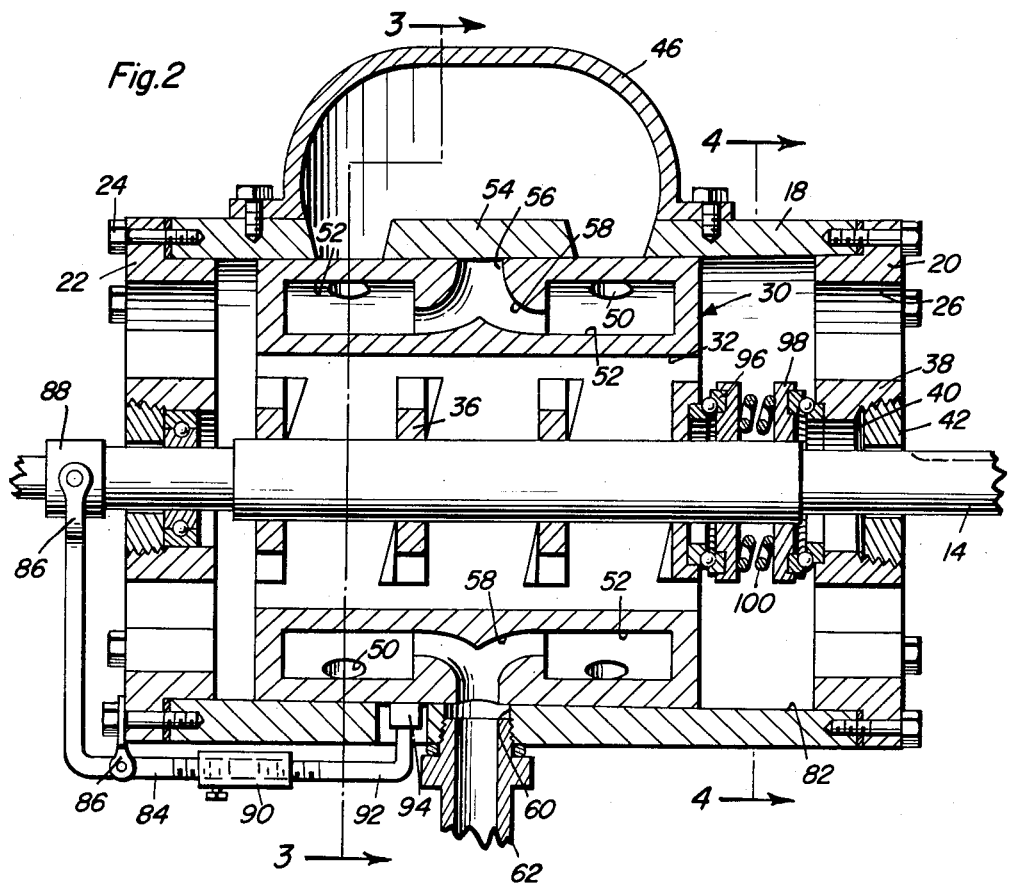
FIGURE 2 is a longitudinal, sectional view taken substantially along a plane passing through the center of the engine.

FIGURE 9 is a transverse sectional view taken substantially upon a plane passing along section line 9—9 of FIGURE 7 illustrating the nozzle arrangement for producing rotation of the burner assembly employed in the pulse jet engine; and FIGURE 10 is a transverse sectional view taken substantially upon a plane passing along section line 10—10 of FIGURE 7 illustrating the valving port arrangement for the pulse jet engine.

Referring now specifically to the drawings, the numeral 10 generally designates the rotary jet engine of the present invention which, for purposes of convenience, has been illustrated as being mounted upon a supporting base 12 or the like and a common shaft 14 is provided which extends longitudinally through the engine 10 and the compressor 16. While the rotary engine 10 would operate with the compressor within the rotor, in this particular construction the compressor 16 is outside of the engine itself and may be orientated in any relation to the engine, such as to the rear of the engine, on top of the engine, or the like. It is characteristic of the engine that a low intake temperature is desired since the cooler combustible mixture will permit a greater volume intake and higher peak pressure at complete combustion.

Referring to FIGURE 2, the shaft 14 extends longitudinally through the engine 10 which includes a stationary housing or stator 18 having removable end plates 20 and 22 held in position by bolts 24 or the like. The end plates 20 and 22 each include a plurality of radial openings 26 forming radial support bars 28 or the like while permitting passage of air through the end walls. Disposed within the stator 18 is the rotor, generally designated by numeral 30, which is also provided with a hollow interior 32 with a plurality of radial support bars 34 extending inwardly to annular rings 36 rigidly secured to the shaft 14 for rotation therewith. Thus, the passageways 26 and the passageways between the arms 34 enable circulation of cooling air through the rotor and through the entire engine for cooling purposes. Preferably, any of the bars 34 are made in the form of fan blades for increasing the circulation of cooling air through the engine.

The arms or bars 28 forming a portion of the end plates 20 and 22 terminate in a bearing block 38 journalling the shaft 14 therein by virtue of ball bearing assemblies 40 and a removable retaining collar 42, thus thus journalling the shaft 14 and permitting longitudinal movement thereof.

The stator or housing 18 is provided with an enlarged circumferential slot-like opening 44 to which is attached an exhaust manifold or diffuser 46 by virtue of bolts 47 or the like, which forms an enlarged expansion chamber 48 for receiving the expanding combustion products from a plurality of passageways or nozzles 50 extending tangentially from the outer edges of combustion chambers 52 which extend longitudinally in the rotor 30. As illustrated in FIGURE 2, there are two peripheral rows of combustion chambers 52 and the area of the stator having the enlarged opening 44 therein is provided with a dividing plate 54 which covers the inlet openings 56 which extend inwardly between the combustion chambers 52 and divide outwardly into branches 58 into what may be termed an intake manifold for supplying both of the combustion chambers 52 with a combustive mixture. The intake port 56 communicates with an inlet opening 60 in the stator 18 in diametrically opposed relation to the exhaust opening 44 and the opening 60 is connected with a supply pipe 62 for the fuel mixture which is supplied from a suitable control mechanism generally designated by numeral 64 which may include any suitable arrangement. Also extending through the stator 18 is an ignition device 66 having a suitable wire 68 extending into the interior thereof for igniting the combustible mixture in the combustion chambers 52. Any suitable ignition device may be employed which should be electrical in nature. For example, an igniter system of any suitable type may be employed. It is pointed out that the fuel mixture may be injected from either the ends of the casing or from the outside surface thereof. The manner of delivering the fuel and air mixture into the inlet ports and the manner of igniting the fuel and air mixture at the proper timed interval is only important to the present invention to the extent necessary to produce the desired result, but the present invention resides in the particular construction and arrangement of components for utilizing the power released due to ignition of the fuel and air mixture.

For additional scavenging of the combustion products from the combustion chambers 52, there is provided a pair of scavenging pipes or manifolds 70, each of which is connected with the casing or stator 18 by virtue of bolts 72 and each of which extends into an exhaust manifold or pipe 74 and terminates in a downstream nozzle 76 disposed in a venturi 78 having a central restricted passageway 80. The high velocity exhaust gases passing through the venturi 80 will cause a reduction or partial vacuum in the manifold 70, thus thoroughly scavenging the exhaust products from the combustion chamber.

In order to compensate for expansion, the stator or housing 18 is provided with a tapered internal surface 82 and the external surface of the rotor 30 is correspondingly tapered so that upon longitudinal movement of the rotor 30 within the stator 18, the clearance between the rotor 30 and the stator 18 may be varied. In order to accomplish this, an operating rod or linkage 84 is provided which is mounted on a bracket 86 secured under one of the bolts 24 for pivotal movement. One end of the link 84 is provided with a yoke 86 pivotally connected with a thrust collar or throwout bearing 88 on the shaft 14. The connection between the yoke 86 and the collar 88 is such that arcuate movement of the yoke 86 about the pivotal connection between the bracket 86 and the link 84 will cause longitudinal movement of the collar 88 and shaft 14. The other end of the link is provided with a longitudinally adjustable threaded connection 90 adjustably receiving a sensing rod 92 having an inturned end portion 94 engaged with the surface of the rotor 30. Thus, as the rotor 30 expands in diameter, the sensing element 94 will be moved outwardly, thus causing pivotal movement of the link 84 about the pivotal connection formed by the supporting bracket 86, moving the rotor 30 to the right as shown in FIGURE 2 and and automatically moving the rotor to an area of the casing having a larger diameter on the internal surface 82, maintaining a constant clearance between the rotor and the stator which is automatically maintained due to the link 84 and the relationship of the structure to this link.

For constantly urging the rotor in one direction in relation to the stator, a thrust ball bearing assembly 96 is provided in engagement with the rotor and a thrust ball bearing assembly 98 is provided in engagement with the end wall 20 and a plurality of springs 100 are disposed intermediate the thrust bearing assemblies 96 and 98. As illustrated in FIGURE 4, the spring assemblies 100 are equally spaced about the center of the shaft 14 and normally urge the rotor to the left against the force exerted by the link 84. By adjusting the slip coupler 90 to limit the inward movement thereof, the clearance between the stator and the rotor may be set or adjusted to a desired degree. In this construction, the shaft itself may move with the rotor or the rotor may have a sliding keyed connection with the shaft 14, in which event the collar 88 is connected to a sleeve extending only to the rotor. However, the shaft may move longitudinally by virtue of the particular bearing assemblies illustrated.

As previously stated, the rotary jet engine of the present invention is a constant volume reaction engine with the combustion process taking place in closed chambers within the rotor 30. The shaft torque is produced by the reaction principle with the combustion products being expanded through the nozzles extending from the combustion chambers to the periphery of the rotors, and these nozzles may be of constant cross-sectional area or may be of divergent characteristics. In either event, the discharge of the combustion products into the enlarged exhaust diffuser provides for expansion of the combustion products and a consequent reaction force being exerted on the rotor.

FIGURE 1 illustrates a typical engine mounted on a base plate but without a fuel tank a muffler which may be employed when desired. One example of the invention occupies a space package approximately twenty inches long, ten inches wide, and ten inches high. The load shaft is available at the right as indicated by numeral 14, and this shaft thus becomes available for direct connection to any desired load. The fuel and air mixture may enter the engine from the supply source either radially through the stator as illustrated, or through the ends of the stator or housing which requires additional sealing of the rotor in relation to the stator. The combustion products exhaust through the scroll-like diffuser around the center section of the housing. A single igniter plug may be provided for each row of combustion chambers, and this may be of any suitable type other than the magneto-type illustrated. A centrifugal compressor 16 is provided to provide the low pressure necessary to charge the combustion chambers and the air flows from the compressor to the fuel mixer and into the engine through the split duct.

Figure 5:
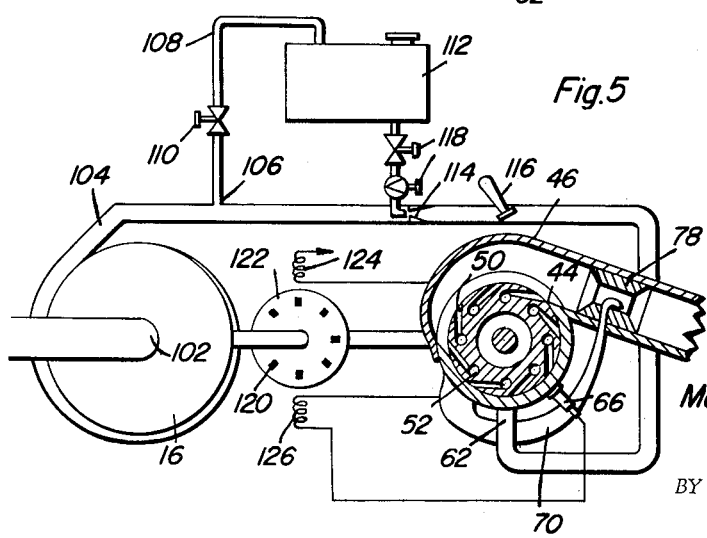
FIGURE 5 is a schematic view of the jet engine employing a single cycle.
Figure 3:
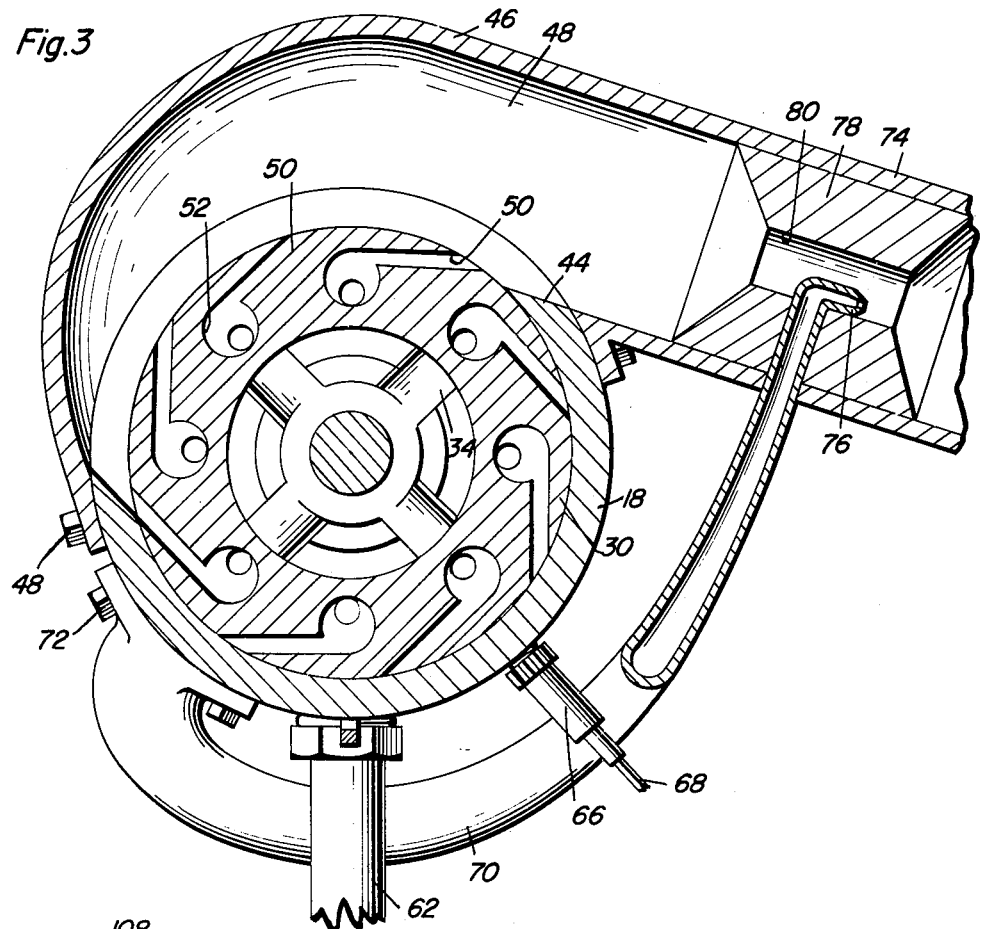
FIGURE 3 is a transverse sectional view taken substantially upon a plane passing along section line 3—3 of FIGURE 2 illustrating the details of structure of the rotor and the relationship of the rotor to the stator.

Referring to FIGURE 5, this figure illustrates a schematic arrangement of the engine operation in which air will enter the compressor 16 by virtue of the intake 102 where it is compressed and then discharges from the compressor at point 104. At point 106, a branch line 108 provided with a valve 110 is employed for pressurizing a fuel tank 112. The pressurization of a fuel tank is not necessary if a gravity head is provided which is sufficient to overcome the relatively low pressure of the fuel mixer which is designated at point 114 and which is generally in the form of a carburetor or the like. At this point, fuel is mixed with the airstream from the compressor and the throttle valve 116 controls the flow of fuel-air mixture into the engine. Suitable valves 118 may be provided in the fuel line leading from the fuel tank. Such valves may include a cutoff valve and a metering valve.

The fuel and air mixture enters the engine through the conduit 62, thus filling the combustion chambers in the rotor. As the combustion chambers move, the entry port is closed by the housing and the combustible mixture is ignited by the igniters 66. As the combustion mixture burns, the pressure rises and at the discharge opening 44, the exhaust nozzle 50 reaches the exhaust diffuser 46 and the hot gases under high pressure start expanding through the nozzle and produce thrust on the rotor. Expansion continues until the nozzle 50 reaches the far edge of the opening 44 where it is again sealed by the solid portion of the rotor housing or stator. At this point, the chamber is well below atmospheric pressure so that a full charge will again be drawn in when the chamber again reaches the inlet port at point 6.

The gas from the nozzles expands into the exhaust diffuser section 46 at supersonic velocities. The diffuser receives the gas at these high velocities and functions to reduce the velocity to the velocity of sound at the venturi 78. In doing this, the reduction in pressure caused by the high velocity through the venturi creates a vacuum in the scavenger manifold 70, thus producing a partial vacuum in the combustion chambers 52 whereby the inlet manifold 56 can function below atmospheric pressure somewhat as it does in a standard internal combustion engine. Due to this, the compressor is essentially unloaded after starting and merely operates to overcome resistance to flow in the ducting to the carburetor.

As illustrated in FIGURE 5, the ignition system employs permanent magnets 120 mounted in the compressor wheel 122 together with two coils 124 and 126, one for each of the igniting plugs, for producing a spark for igniting the combustible mixture. These are staggered by 22½° in the same way that the combustion chambers are staggered between the two rows so that the spark timing is identical for both rows of combustion chambers. Spark advance can be varied by mounting the coils on a movable plate and using the manifold pressure to rotate the plate slightly on the compressor housing, thereby providing automatic spark advance.

Due to the extent of the slot 44, four nozzles may be communicated with the exhaust diffuser at any given time. Of course, these nozzles have a progressively diminishing pressure therein. Inasmuch as there are two rows of combustion chambers and they are staggered half way between the chambers in the adjacent row, there are actually three nozzles in one row of combustion chambers exhausting into the diffuser and four nozzles on the other row. Thus, the thrust of seven nozzles provides driving impulses or force to the rotor simultaneously. At 6000 r.p.m. 96,000 driving impulses per minute are being applied to the rotor to produce an absolutely smooth power output. While only two rows of nozzles are shown, the number of nozzles will vary according to horsepower required by elongating the rotor and stator. Since the nozzles pass the scavenger before again reaching the intake, the scavenge ejector functions to remove any exhaust products that might be left before full function of the exhaust diffuser is reached in performing this function.

Figure 6:
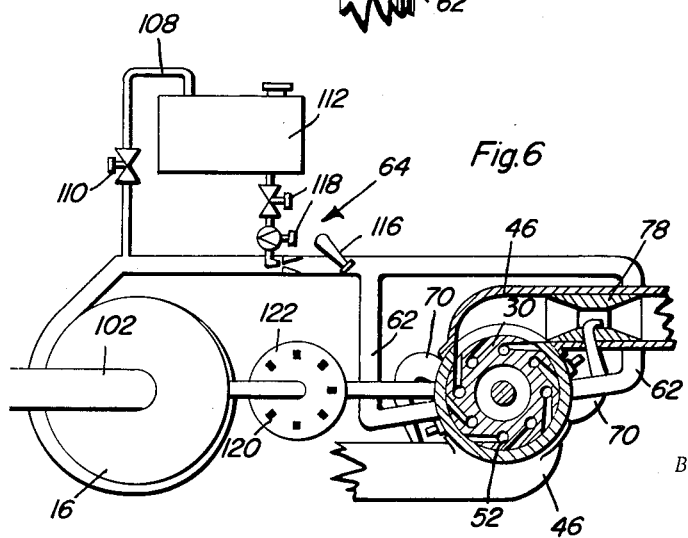
FIGURE 6 is a schematic view illustrating the jet engine employing the double cycle.

FIGURE 6 illustrates schematically the double cycle flow diagram and differs only from the single arrangement in that two exhaust diffusers 46 are employed which are diametrically opposed along with two sets of igniters and, of course, two arrangements of inlet ports. This arrangement requires a slightly increased rotor diameter and, of course, a slightly increased stator or housing diameter. The use of the double cycle will produce large increases in power output with only nominal increases in engine size. For purposes of clarity, the numerals employed to identify the structure in FIGURE 5 are used in connection with FIGURE 6. The double and single cycles are identical except that each chamber is charged, ignited and exhausted twice in each rotor revolution.

In the sliding construction of the rotor, the inlet port 56 and the inlet opening 60 are related so that they will be communicated regardless of the position of the rotor. This is also true of the nozzles 50 and the exhaust openings or slots 44, especially as to their width on either side of the separating plate 54. Also, the slip joint 90 may be somewhat in the nature of a turnbuckle or the like in that the sleeve is threaded onto both ends of the rods or links 92 and 84 and retained in adjusted position by a setscrew lock or the like, thus enabling the normal position or initial position of the rotor 30 to be adjusted by releasing the setscrew lock and rotating the sleeve 90 somewhat in the nature of a turnbuckle.

Also, the convergent-diversion section or venturi is in the form of an insert which may be moved longitudinally either manually or mechanically by vacuum in the far end of the exhaust collector or diffuser. Also, the air flow through the center of the rotor probably will be thermostatically controlled and will include shutter-like fins that will open or close to adjust the volume of air so as to maintain predetermined temperatures of the engine, thus maintaining a constant and desired thermal efficiency. Thus, the colder the engine, the less air that would circulate and the hotter the engine, the more air would circulate through the rotor for holding the operating temperatures to or slightly below a desired maximum. The fan blades or bars in the rotor serve two purposes in that they support the rotor on the shaft and also circulate air through the end plates and the rotor. Further, the mechanism for operating the rotor may be varied and other similar and equivalent mechanism may be employed and, actually, the element which contacts the rotor may be in the form of a roller or the like to eliminate and reduce friction to a desired low level.

FIGURES 7–10 illustrate a modified form of invention which extends to a pure jet engine by employing the same principle and the same cycle as the rotary jet engine, only in this construction the jet exhaust is to the rear as well as radially through nozzles which rotate the unit.

This unit includes a generally cylindrical shell 130 which includes a slightly inwardly curved forward portion 132 and an outwardly flared forward end forming an air scoop 134 for the inlet of air into a centrifugal air compressor 136.

The shell 130 is provided with an elongated central shaft 138 supported by roller bearing assemblies 140, 142, and 144. The roller bearing assembly 140 is supported by a plurality of radially extending arms 146 disposed forwardly of the compressor 136. Of course, the compressor is rigidly affixed to the shaft 138. The bearing assembly 142 is supported in a partition plate 148 disposed rearwardly from the compressor 136 and generally defines with the compressor 136 an intake area or manifold 150. The rear bearing 144 is supported in a rear plate 152 which forms a rear wall for the central portion of the shell. The rear of the shell is provided with a generally cylindrical extension 154 which receives the main exhaust products for confining them during the thrust which they exert.

The front partition 148 is provided with a plurality of inlet ports 156, each of which is provided with a venturi-like inlet 158 which may be in the form of twin carburetors or fuel injectors for supplying a pressurized fuel and air mixture into the two inlet ports 156 which are disposed at diametrically opposed points as illustrated in FIGURE 8. Also, the partition plate 148 is provided with diametrically opposed ignition means 160 which may be in the form of any suitable type of igniter which will ignite the fuel and air mixture after it is discharged into one of a plurality of combustion chambers 162. The combustion chambers extend between and are rigid with a front plate 164 and a rear plate 166 which are rigidly secured to the shaft 138. The combustion chambers 162 are spaced from each other and spaced from the shaft, and the number of combustion chambers may vary as desired. Each combustion chamber receives a charge of combustible mixture from the inlet port 156 and then as it passes over the igniter 160, the charge within the combustion chamber 162 is ignited.

As illustrated in FIGURE 10, the rear partition plate 152 acts as a valving plate in that it is provided with a pair of diametrically opposed arcuate slots 168 therein which communicate with the discharge nozzles 170 extending longitudinally from the combustion chambers 162 and through the rear plate 166, thus discharging the combustion products with the ports 168 forming the main thrust ports for discharge of the major portion of the exhaust products whereby expansion of the exhaust products will provide a thrust in the usual manner.

For rotating the combustion chambers, each combustion chamber is provided with a radially extending tube or nozzle 172 which also extends tangentially so that a portion of the expanding exhaust products pass out through the nozzle 172. The nozzles 172 communicate with an exhaust opening 174 in a stator 176 with the exhaust opening 174 also communicating with a space 178 between the stator or ring 176 and the shell 130, thus discharging the exhaust products into the interior of the shell 130. The ring 176 is supported by radial supporting brackets 180 and the exhaust products are thus discharged out through exhaust vents 182 at the rear of the shell 130 and immediately forwardly of the transverse plate 152. Also, intake air is brought into the shell 130 at the forward end thereof through vents 184 for purposes of cooling the rotating combustion chambers.

The rotating jet nozzles and their relationship to the slotted sealing band will release sufficient gas to drive the compressor. After forward momentum or a desired speed has been reached, the exhaust slot openings are reduced to permit less loss to side jets and to increase the rear thrust accordingly. Also, the sealing band could have a slide to open or close the slot therein depending on the amount of rotary power needed.

The present structure forms a pulse jet engine which uses a porting and rotor valving method. As the air is admitted to the combusiton chambers through ports, fuel is mixed with the air. The combustion chambers are then rotated with the fuel and air mixture therein which rotation forms a seal for the combustion chambers. A slight pressure rise occurs as the incoming velocity decreases and as the rotating section moves to the left to a position in alignment with the ignition device, an electrical spark induced by an igniter of any suitable construction will ignite the combustible mixture. Also, igniters may be placed in the rear plate 152 in order that ignition may occur at both ends of the combustion chambers so that burning might be directed in both directions toward the center of the combustion chambers to speed up the pressure rise through expansion. As the rotor moves further to the left, the exhaust ports are opened in the rear and as pressure builds up rapidly, it causes acceleration of the gas from the tail nozzle from which it emerges as a jet. As the gas passes along the nozzle, the pressure in the combustion chamber drops to below atmospheric pressure before the intake is again open to the intake port. The rotational speed is obtained by small tangential nozzles and this rotary movement is necessary for the inlet, ignition and exhausting cycle and also is necessary to drive the single stage centrifugal compressor which is necessary while starting. After a speed is obtained, the centrifugal compressor is no longer necessary but will serve to reduce the drag of air passing into the device. This device may be rather inexpensively produced and operates at highest efficiency and is a vast improvement in the pulse jet field. Each chamber may be fired twice per revolution with a variable number of chambers being available. For example, a practical construction involves the use of eight combustion chambers, although only four are shown in the drawings, which would result in sixteen impulses per revolution. At 10,000 r.p.m., the unit would produce 160,000 impulses per minute. Present-day conventional pulse jet engines produce only 40 impulses per second or 2400 per minute and require rocket launching devices. Further, the fuel introduction would be either by a solid fuel injection with fuel pumps operated from the shaft or some type of carburetor device.

In the design of engine developed to produce 10-brake horsepower and also in an engine for producing 20-brake horsepower, the following calculations have been made:

A. EFFICIENCY—UNTHROTTLED OTTO CYCLE

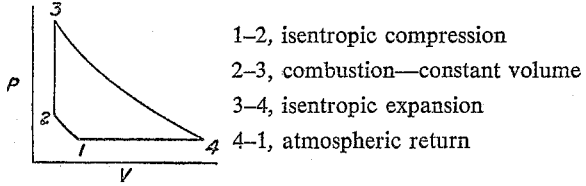

1-2, isentropic compression
2-3, combustion—constant volume
3-4, isentropic expansion
4-1, atmospheric return Cycle efficiency calculations assume:
(1) No heat losses
(2) No throttle losses
(3) No mechanical losses

*Base Conditions*

(1) $P_1=14.7$ p.s.i.a. Charge temperature $=T_c=520°$ R.

(2) $P_2=24.7$ p.s.i.a.,
$$rp=\frac{24.7}{14.7}=1.68 P_2-p=10 \text{ p.s.i.}$$

(3) Stoichiometric mixture—100% combustion air
$Wf/Wa=0.0655 \#$'s/#; $Ec=1281$ B.t.u./# air (4) Hydrocarbon fuel—$(CH_{2.25}) \times 19,270$ B.t.u./# fuel (5) Charge=0.246 combustion products and 0.754 fresh charge. $f=.246$, $1-f=.754$ (6) Charge temperature=1320° R.
Fraction fresh charge+charge temperature based on successive approximation solution for initial conditions given above.

(1)
$$V_1=\frac{(0.0353+.002f)1545 \times 1320}{14.7 \times 144}$$
$$=\frac{0.0358 \times 1545 \times 1320}{14.7 \times 144}=34.4 \text{ ft.}^3$$

(2) $Es_1=172$ B.t.u. (TEH chart, 100% air, 1320° R.)

(3) $T_2=T_1 \times rp^{R-1/R}=1320 \times 1.68^{.286}=1545°$ R.

(4) $V_2=19.8$ ft.³ (Compression Chart, 100% air, 1545° R.)

(5) $Es_2=228$ B.t.u. (TEH chart, 100% air, 1545° R.)

(6) $Ec=1281(1-f)=1281 \times .754$
$=966$ B.t.u./# mixture (7) $E_3=Ec+E_2=966, 288=1194$ B.t.u.

(8) $T_3=4510°$ R., $P_3=96$ p.s.i.a., $S_3=0.644$
(from Combustion Chart, 19.8 ft.³, 1194 B.t.u.)

(9) $T_4=3390°$ R., $E_4=730$ B.t.u., $H_4=975$ B.t.u.
(from Comb. Chart, 14.7 p.s.i.a., $S_4=0.644$)

(10) Work
$W=E_3-E_4-(F_2-E_1)=1194-730$
$-(228-172)=464-56=408$ B.t.u.

(11) Thermal efficiency
$$N_{cycle}=\frac{W \times 100}{Ec}=\frac{408}{966} \times 100=42.2\%$$

(12) Check initial assumptions of 1320° R. initial temperature of mixed fresh charge and combustion products remaining.

$h_{520°R}=36$ B.t.u. TEH chart, 100% air
$h_{3390°R}=975$ B.t.u. (Combustion Chart, Step 9 above)
$h_{mix}=0.246 \times .975+0.754 \times 36=240+27.2=267$ B.t.u.
1325° R. corresponds to 267 B.t.u.—check

(13) Shaft efficiency
42.2% × .5—21.1% shaft efficiency

This is based upon estimated 50% loss between Otto cycle thermal efficiency and shaft efficiency.

B. FUEL-AIR REQUIREMENTS (1) Shaft work in B.t.u./#=408 × .5=204 B.t.u. based on 50% conversion (2) Fuel requirements—10 B.H.P.
$$\frac{10 \times 33000 \times 966}{778 \times 204 \times 19,270}=0.1042 \#/\text{min. fuel}$$

.1042 × 60=6.27#/hr. @ 10 B.H.P.
6.27/10=.627#/hr. 1 B.H.P.

(3) Air required $$0.1042 \times 15 = 1.568 \text{ \#/min. air}$$

C. ENGINE COMBUSTOR DISPLACEMENT (1) $\quad V_1 = \dfrac{20.5}{.754} = 27.2 \text{ ft.}^3/\text{min. total charge}$ (2) $\quad V_2 = 27.2 \times \dfrac{14.7}{24.7} \times \dfrac{1320}{520} = 41.1 \text{ ft.}^3/\text{min. volume}$ (3) Rotor displacement, 10 B.H.P.:
 a. 6,000 r.p.m.

$$\dfrac{41.1 \times 1728}{6000} = 11.82 \text{ in.}^3$$

b. 8,000 r.p.m.

$$\dfrac{41.2 \times 1728}{8000} = 8.87 \text{ in.}^3$$

c. 12,000 r.p.m.

$$\dfrac{41.1 \times 1728}{12000} = 5.92 \text{ in.}^3$$

(4) Rotor displacement, 20 B.H.P.

(a) 6,000 r.p.m. ---------- $11.82 \times 2 = 23.64$ in.$^3$
(b) 8,000 r.p.m. ---------- $8.87 \times 2 = 17.74$ in.$^3$
(c) 12,000 r.p.m. --------- $5.92 \times 2 = 11.84$ in.$^3$

D. COMBUSTOR ROTOR DIMENSIONS AND WEIGHT (1) Assume 4.0" diameter, 20 chambers, 2 rows
 Allow wall thickness $= 0.2'' = S$
 Pockets per row $= N = 10$, diameter $= D = 4.0''$ (a) $\quad R + r \quad S = D/2$ (b) $\quad \dfrac{2\pi R}{N} - 2r = S$

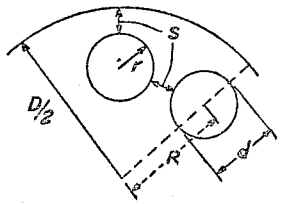

$$\dfrac{2\pi R}{N} - 2(1.8 - R) = 3$$

$$R\left(2 + \dfrac{2\pi}{N}\right) = 3.8$$

$$R = \dfrac{3.8}{2 + \dfrac{6.28}{10}} = 1.44$$

$$r = 1.8 - 1.44 = 0.36''$$

$$d = 2r = 0.72'' \text{ diameter}$$

(c) Chamber length $$\text{Volume} = \dfrac{8.87}{20} = 0.4435 \text{ in.}^3$$

$$\text{length } l = \dfrac{.4435}{\dfrac{.72^2 \pi}{4}} = \dfrac{.4435}{.407} = 1.09''$$

Chamber dimensions 0.72" D x 1.1" long
Assuming end plates $= 0.31''$ thick
 Initial length $$l = 2 \times 1.09 \quad 2 \times .31 + 0.4$$
$$= 3.2''$$

Assume hole in end plate $= 0.5''$ diameter $$\text{Hole volume} = \dfrac{.5^2 \pi}{4} \times .31 = 0.0617 \text{ in.}^3$$

Chamber vol. $0.4435 - .0617 = 0.3818$ in.$^3$
New chamber length $$\dfrac{.3818 \text{ in.}^3}{.407 \text{ in.}^2} = 0.938 \text{---use } 0.94''$$

Rotor length $$2 \times .94 + 2 \times .31 + .4 = 1.88 + .62 \quad .4 = 2.90''$$

Rotor dimensions—10 B.H.P. @ 8000 r.p.m.

4.0" diam. x 2.90" length

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary jet engine comprising a stationary stator having a cylindrical hollow interior, a substantially cylindrical rotor mounted in the stator and including a plurality of circumferentially spaced combustion chambers therein, said rotor including a plurality of tangentially extending nozzles communicating with the combustion chambers with the cylindrical peripheral surface of the rotor, said stator having an opening therein with which the nozzles communicate for expansion of combustion products from the nozzles, thereby causing rotation of the rotor, means extending radially into the rotor for supplying a combustible mixture to the combustion chamber, and means extending radially through the stator for igniting the combustible mixture prior to registry of the nozzle with the opening in the stator, said rotor being in the form of an annular member having two peripheral rows of circumferentially spaced and staggered combustion chambers, a common radial inlet for a fuel mixture for the combustion chambers, said igniting means serving both rows of combustion chambers, said stator having slot-like openings for each row of combustion chambers, and means for scavenging the combustion chambers after they pass over the openings in the stator.

2. The structure as defined in claim 1 wherein said rotor is externally tapered longitudinally, said hollow interior of the stator being correspondingly tapered whereby longitudinal movement of the rotor in the stator will change the clearance between the rotor and stator, and means for automatically moving the rotor longitudinally in response to expansion thereof.

3. The structure as defined in claim 2 wherein said means includes a feeler in engagement with the periphery of the rotor, a linkage mechanism interconnecting the feeler and the rotor for moving the rotor longitudinally upon radial expansion thereof.

4. The structure as defined in claim 3 wherein an inlet conduit extends between the stator and the discharge side of a compressor, an exhaust conduit carrying the exhaust products, and a venturi in the exhaust conduit, and a scavenging pipe interconnecting the stator and the throat of the venturi for reducing the pressure in the combustion chambers thus assisting in pulling a new combustible mixture into the chambers.

References Cited in the file of this patent

UNITED STATES PATENTS

| 800,684 | Schneider | Oct. 3, 1905 |
| 1,394,411 | Geake | Oct. 18, 1921 |
| 2,011,420 | Samuelson | Aug. 13, 1935 |
| 2,389,632 | Mossbach | Nov. 27, 1945 |
| 2,705,867 | Lewis | Apr. 12, 1955 |

FOREIGN PATENTS

| 405,037 | Germany | Oct. 27, 1924 |
| 290,014 | Great Britain | May 10, 1928 |
| 469,180 | Great Britain | July 20, 1937 |
| 1,014,794 | Germany | Jan. 3, 1957 |